United States Patent
Corbett, Jr.

(10) Patent No.: US 7,461,848 B2
(45) Date of Patent: Dec. 9, 2008

(54) SNAP IN PLACE GASKET FOR SEALING PLASTIC PIPELINES AND METHOD OF INSTALLATION

(75) Inventor: Bradford G. Corbett, Jr., Fort Worth, TX (US)

(73) Assignee: S & B Technical Products, Inc., Fort Worth, TX (US)

( * ) Notice: Subject to any disclaimer, the term of this patent is extended or adjusted under 35 U.S.C. 154(b) by 0 days.

(21) Appl. No.: 11/766,849

(22) Filed: Jun. 22, 2007

(65) Prior Publication Data

US 2007/0257448 A1 Nov. 8, 2007

Related U.S. Application Data

(62) Division of application No. 11/220,054, filed on Sep. 6, 2005, now Pat. No. 7,310,867.

(60) Provisional application No. 60/616,463, filed on Oct. 6, 2004.

(51) Int. Cl.
*F16L 17/00* (2006.01)
*F16J 15/02* (2006.01)

(52) U.S. Cl. .................. 277/607; 277/609; 277/611; 277/615; 277/626; 277/639; 277/644

(58) Field of Classification Search ............... 277/604, 277/606–609, 611, 615–618, 626–627, 628, 277/630, 637–639, 644, 647–651
See application file for complete search history.

(56) References Cited

U.S. PATENT DOCUMENTS

| | | | | |
|---|---|---|---|---|
| 3,390,890 A | * | 7/1968 | Kurtz | 277/625 |
| 4,368,894 A | * | 1/1983 | Parmann | 277/615 |
| 4,487,421 A | * | 12/1984 | Housas et al. | 277/616 |
| 4,510,664 A | * | 4/1985 | Lock | 29/450 |
| 4,641,858 A | * | 2/1987 | Roux | 285/94 |
| 4,871,180 A | * | 10/1989 | Preisendorfer | 277/625 |
| 5,067,751 A | * | 11/1991 | Walworth et al. | 285/105 |
| 5,324,083 A | * | 6/1994 | Vogelsang | 285/110 |
| 6,152,494 A | * | 11/2000 | Corbett et al. | 285/110 |
| 6,173,967 B1 | * | 1/2001 | Eskew et al. | 277/606 |

* cited by examiner

*Primary Examiner*—Vishal Patel
(74) *Attorney, Agent, or Firm*—Charles D. Gunter, Jr.

(57) ABSTRACT

A pipe sealing gasket is shown which is designed to be received within a groove provided within a belled, socket end of a plastic pipe. The groove in the plastic pipe is preformed during manufacture and the gasket is installed thereafter. The gasket nominal diameter exceeds the internal diameter of the belled pipe end. A special installation tool is used to pull the gasket from an initially deformed, elliptical shape to a normal cylindrical shape. The installation tool uses only one fluid cylinder for power and can be hand installed and operated.

3 Claims, 4 Drawing Sheets

SNAP IN PLACE GASKET FOR SEALING PLASTIC PIPELINES AND METHOD OF INSTALLATION

CROSS-REFERENCE TO RELATED APPLICATIONS

The present application is a divisional application of prior Ser. No. 11/220,054, filed Sep. 6, 2005 now U.S. Pat. No. 7,310,867, entitled "Snap In Place Gasket for Sealing Plastic Pipelines and Method of Installation," and claims priority from earlier filed provisional application Ser. No. 60/616,463, filed Oct. 6, 2004, entitled "Snap In Place Gasket for Sealing Plastic Pipelines and Method of Installation," by Bradford G. Corbett, Jr.

BACKGROUND OF THE INVENTION

1. Field of the Invention

The present invention relates generally to sealing gaskets and sealing systems used for pipe joints in plastic pipelines in which a male spigot pipe section is installed within a mating female socket pipe section to form a pipe joint and, more specifically, to an improved gasket and installation method for installing a locked-in gasket within a preformed gasket groove in a section of pipe used to form a pipe joint.

2. Description of the Prior Art

Fluid sealing systems for plastic, fluid conveying pipes are used in a variety of industries. The pipes used in such systems are typically formed from thermoplastic materials including polyolefins and PVC. In forming a joint between sections of pipe, the spigot or male pipe end is inserted within the female or socket pipe end. An annular, elastomeric ring or gasket is typically seated within a groove formed in the socket end of the thermoplastic pipe. As the spigot is inserted within the socket, the gasket provides the major seal capacity for the joint. Various types of sealing technologies have been employed to assure the sealing integrity of the pipe joint. It is important that the sealing gasket not be dislodged during the joint make up and that the gasket not become twisted or otherwise compromised in field applications.

In earlier gasketed sealing systems, the gasket was generally deformable, allowing it to be flexed or bent by hand and inserted within a mating groove formed in the female, belled pipe end. One attempt to insure the integrity of such pipe joints involved the use of a pipe gasket having one region formed of an elastically yieldable sealing material, such as rubber, and a second distinct region formed of a more rigid material, such as a rigid plastic. The rigid region of the gasket tended to hold the gasket in place within the pipe groove. Other approaches to the problem included the use of a homogeneous rubber ring with a stiffening band which was manually inserted into a mating groove provided on the internal diameter of the rubber ring. In other words, the rubber ring was first flexed or bent and inserted into the groove in the belled pipe end. The rigid retaining ring was then inserted into a groove in the rubber gasket ring. Each of these solutions was less than ideal, in some cases failing to provide the needed joint integrity and often contributing to the complexity and expense of the manufacturing operation.

In the early 1970's, a new technology was developed by Rieber & Son of Bergen, Norway, referred to in the industry as the "Rieber Joint." The Rieber system employed a combined mould element and sealing ring for sealing a joint between the socket end and spigot end of two cooperating pipes formed from thermoplastic materials. In the Rieber process, an elastomeric gasket was installed within an internal groove in the socket end of the female pipe as the female or belled end was simultaneously being formed. Rather than utilizing a preformed groove, the Rieber process provided a prestressed and anchored elastomeric gasket during the belling operation. Because the gasket was installed simultaneously with the formation of the belled pipe end, a rigid, embedded reinforcing ring could be supplied as a part of the gasket. Because the pipe groove was, in a sense, formed around the gasket with its embedded reinforcing ring, the gasket was securely retained in position and did not tend to twist or flip or otherwise allow impurities to enter the sealing zones of the joint, thus increasing the reliability of the joint and decreasing the risk of leaks or possible failure due to abrasion. The Rieber process is described in the following issued United States patents, among others: U.S. Pat. Nos. 4,120,521; 4,061,459; 4,030,872; 3,965,715; 3,929,958; 3,887,992; 3,884,612; and 3,776,682.

Despite the advances offered by the Rieber process, the belling operation was somewhat complicated and costly. Also, certain situations exist in which it would be desirable to install a gasket within a preformed groove in the selected pipe end, rather than utilizing an integrally installed gasket in which the groove in the pipe is formed around the gasket.

As mentioned above, in the prior art joints utilizing preformed grooves, gaskets were often provided in two parts. The main gasket body was formed of an elastomeric material and typically featured an internal groove or recess The main gasket body was first flexed by hand and installed within the groove provided in the belled pipe end. A hardened band, formed of rigid plastic or metal, was then installed by hand within the groove provided on the internal circumference of the gasket. While such retaining bands helped to resist axial forces acting on the gasket during assembly of the joint, the band could become displaced or twisted during the insertion operation. It would therefore be advantageous to be able to install a gasket of the type having an embedded reinforcing ring within a previously belled pipe end. However, gaskets with embedded reinforcing rings are not easily bent or flexed by hand, thus generally precluding hand assembly in the field. The size and position of the embedded ring within the gasket body generally was greater than the diameter of the mouth opening of the belled pipe end, presenting a further complication for assembly.

U.S. Pat. No. 6,044,539, issued Apr. 4, 2000, to Guzowski, and commonly owned by the present applicant describes a machine for inserting a "snap-fit" gasket having an embedded reinforcing ring into a preformed gasket receiving groove in a belled pipe end. However, such a machine was fairly costly to construct and was not capable of being hand carried by a worker in the field.

The present invention has, as one object, to provide an improved pipe gasket for use in pipe joints which offers the advantage of a Rieber type locked-in seal while allowing the gasket to be installed in a preformed groove in snap-fit fashion, either at the manufacturing plant or in a field operation.

Another object of the invention is to provide an improved gasket which is securely retained within a preformed pipe groove without the necessity of a separate retaining band.

Another object of the invention is to provide an improved method of installing a reinforced gasket within a preformed pipe groove.

Another object of the invention is to provide a method for installing a gasket having a known external diameter within the mouth opening of a belled end of a pipe section where the external diameter of the gasket exceeds the internal diameter of the mouth opening of the pipe section.

Another object of the invention is to provide an improved gasket installation apparatus which is simpler and less costly than existing devices and installation techniques.

SUMMARY OF THE INVENTION

A method is shown for installing a gasket within a gasket receiving groove provided within the belled end of a plastic pipe section. The belled end has a mouth opening which is engageable with a spigot end of a mating plastic pipe section to form a pipe joint. The pipe section having the belled end is first oriented along a horizontal work axis. An annular gasket is then inserted within the mouth opening of the belled end. The annular gasket is oriented at an oblique angle with respect to the horizontal work axis, whereby a leading edge is received in the pipe groove and a trailing edge of the annular gasket moves past the annular groove provided in the belled end. A retracting force is then exerted on the annular gasket by pulling the trailing edge thereof backwards in the direction of the mouth opening of the belled end until the gasket snaps into a locked-in position within the annular groove.

Preferably, the annular gasket has a body formed of a flexible elastomeric material and has a relatively rigid ring which is located at an embedded location which circumscribes the gasket body. Preferably, the relatively rigid ring is made of steel and is generally round in cross-section. The relatively rigid ring has an internal diameter which defines a locus of points which is equal to or greater than the internal diameter of the remainder of the belled end of the pipe which joins the annular groove. The relatively rigid ring tends to resist axial forces tending to displace the gasket from the annular groove when in position within the groove.

The gasket is preferably hand installed by means of an fluid piston operated installation tool. Once the gasket is initially positioned at an oblique angle within the belled pipe end, a mechanically operated insertion device is placed on the belled end of the plastic pipe. The insertion device is then actuated to thereby exert a retracting force on the annular gasket by pulling the trailing edge thereof backwards in stages in the direction of the mouth opening of the belled end until the gasket again assumes a generally cylindrical shape and snaps into a locked-in position within the annular groove.

The preferred installation tool has a mounting fixture which at least partially circumscribes the belled end of the pipe, the mounting fixture also supporting an insertion guide and an associated retraction element. The mechanically operated insertion device is actuated to thereby exert a retracting force on the annular gasket by moving the retraction element along a longitudinal axis of the insertion guide, thereby pulling the trailing edge of the gasket backwards in stages in the direction of the mouth opening of the belled pipe end. The longitudinal axis of the positioning guide is oriented generally parallel to the horizontal axis of the belled pipe end during use. The preferred mounting fixture has an associated fluid operated cylinder which can be selectively actuated to move the retraction element back and forth along the longitudinal axis of the positioning guide. The insertion apparatus features a gripping handle which can be gripped by a user to hand position the apparatus on the belled pipe end.

An improved gasket is also shown for use with the installation tool. The gasket has a gasket body formed of a flexible elastomeric material, the gasket body having a relatively rigid ring located at an embedded location which circumscribes the gasket body. The relatively rigid ring is generally round in cross section and has a cross sectional diameter which defines a locus of points on an inner surface thereof which is equal to or greater than the internal diameter of the remainder of the belled end of the pipe which joins the gasket receiving groove when the gasket is installed within the belled pipe end. Preferably, the gasket body has a width to thickness ratio and wherein the ratio is greater than about 1.75:1.0. Most preferably, the width to thickness ratio is approximately 2:1.

The preferred sealing gasket has an inner sealing surface which is provided with a series of serrations thereon. The inner sealing surface is joined to a leading face which joins a convex nose region which continues to form a primary sealing surface. The primary sealing surface comprises an evenly sloping outer face of the body and forms a lip region thereof. The lip region is separated from a trailing face of the gasket body by means of a pair of convex regions which allow the lip region to converge inwardly as the mating male spigot end of the mating pipe section encounters the primary sealing surface of the gasket.

Additional objects, features and advantages will be apparent in the written description which follows.

DETAILED DESCRIPTION OF THE INVENTION

Figure 1:
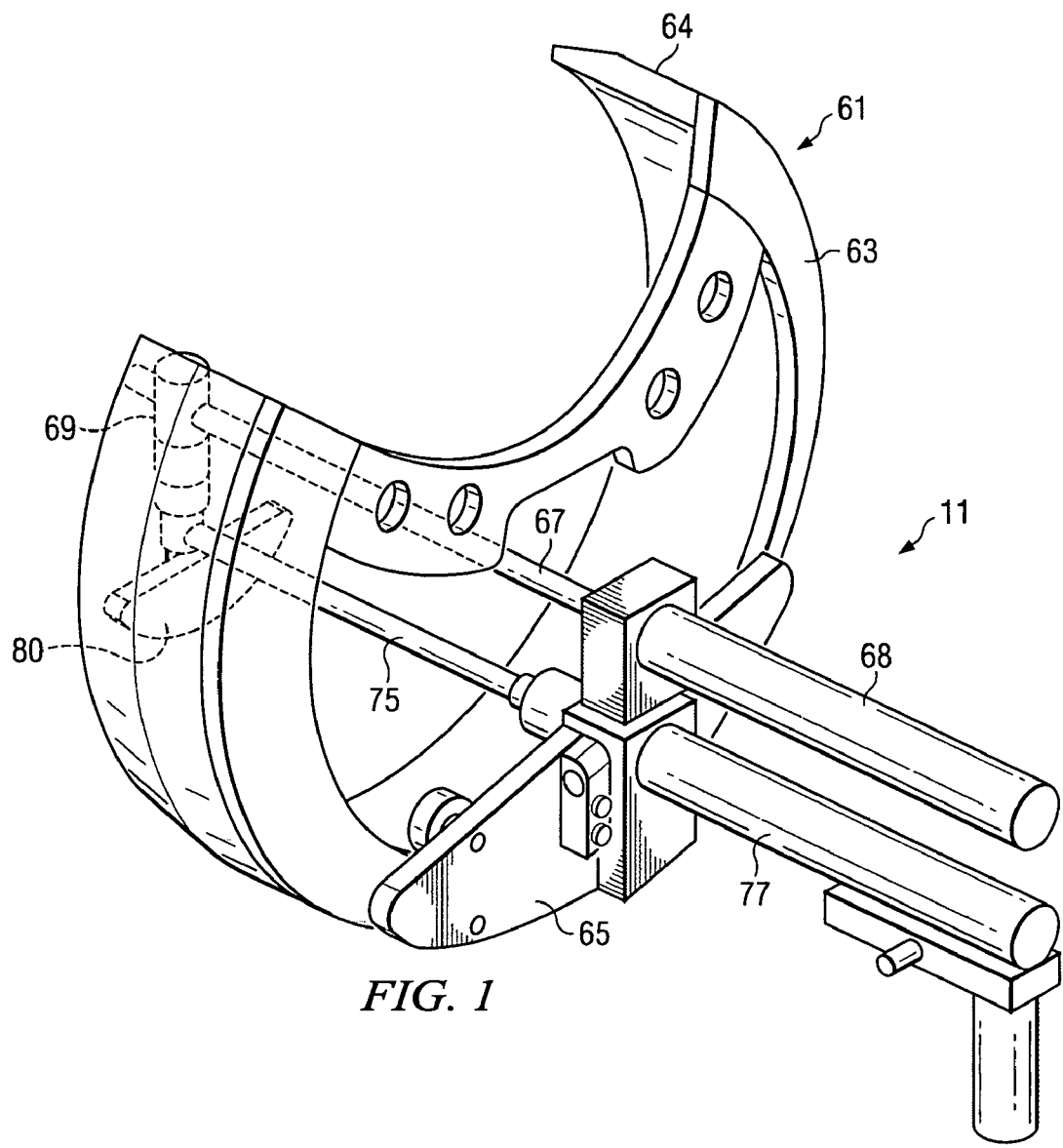
FIG. 1 is an end view of the insertion apparatus used to install the gasket of the invention within the preformed groove in the female, belled pipe end with portions of the insertion guide and retraction element being shown in phantom lines.
Figure 4:
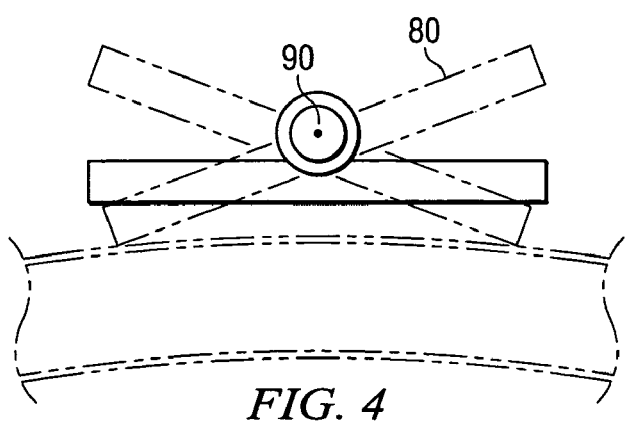
FIG. 4 is a simplified, schematic view, looking down on the retraction element, showing the pivoting movement thereof.
Figure 3:
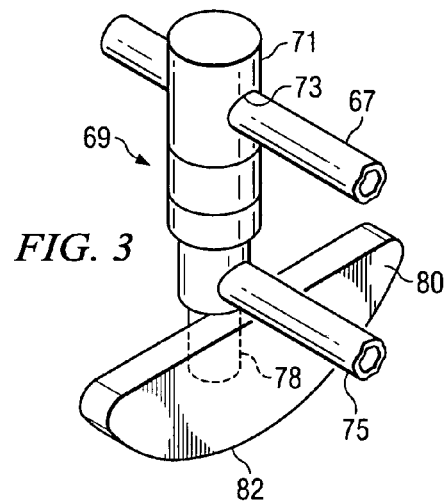
FIG. 3 is an isolated view of a portion of the insertion guide and associated retraction element.
Figure 2:
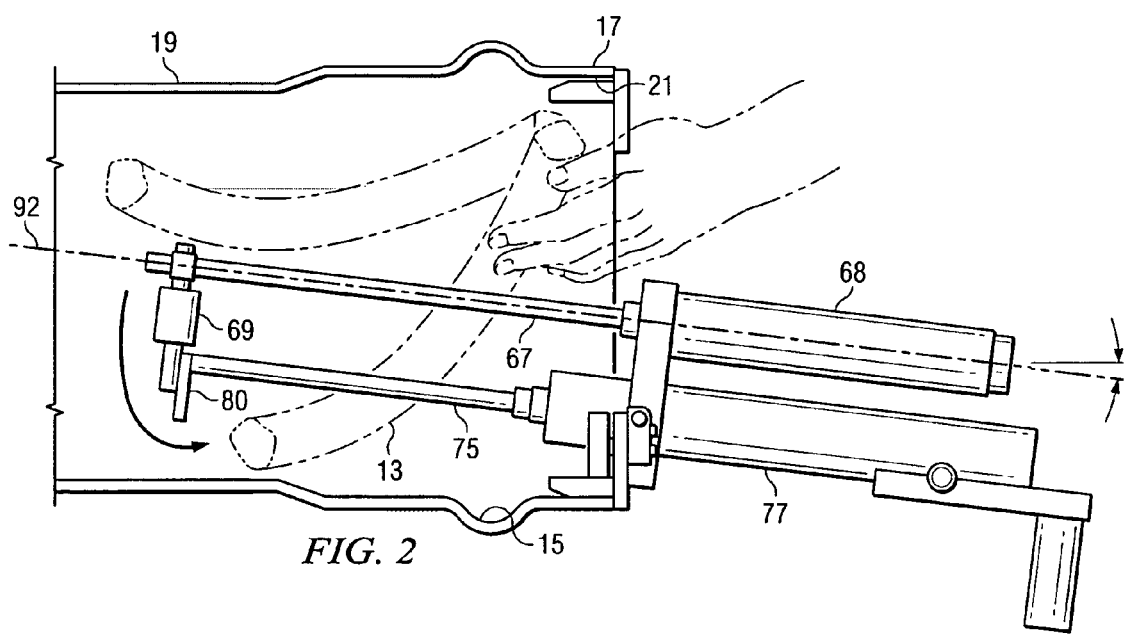
FIG. 2 shows the first step in the installation method of the invention in which the mounting fixture of the apparatus is placed onto the female, belled pipe end and a sealing gasket is placed within the belled pipe end with a leading edge of the gasket being positioned in the internal pipe groove.
Figure 5:
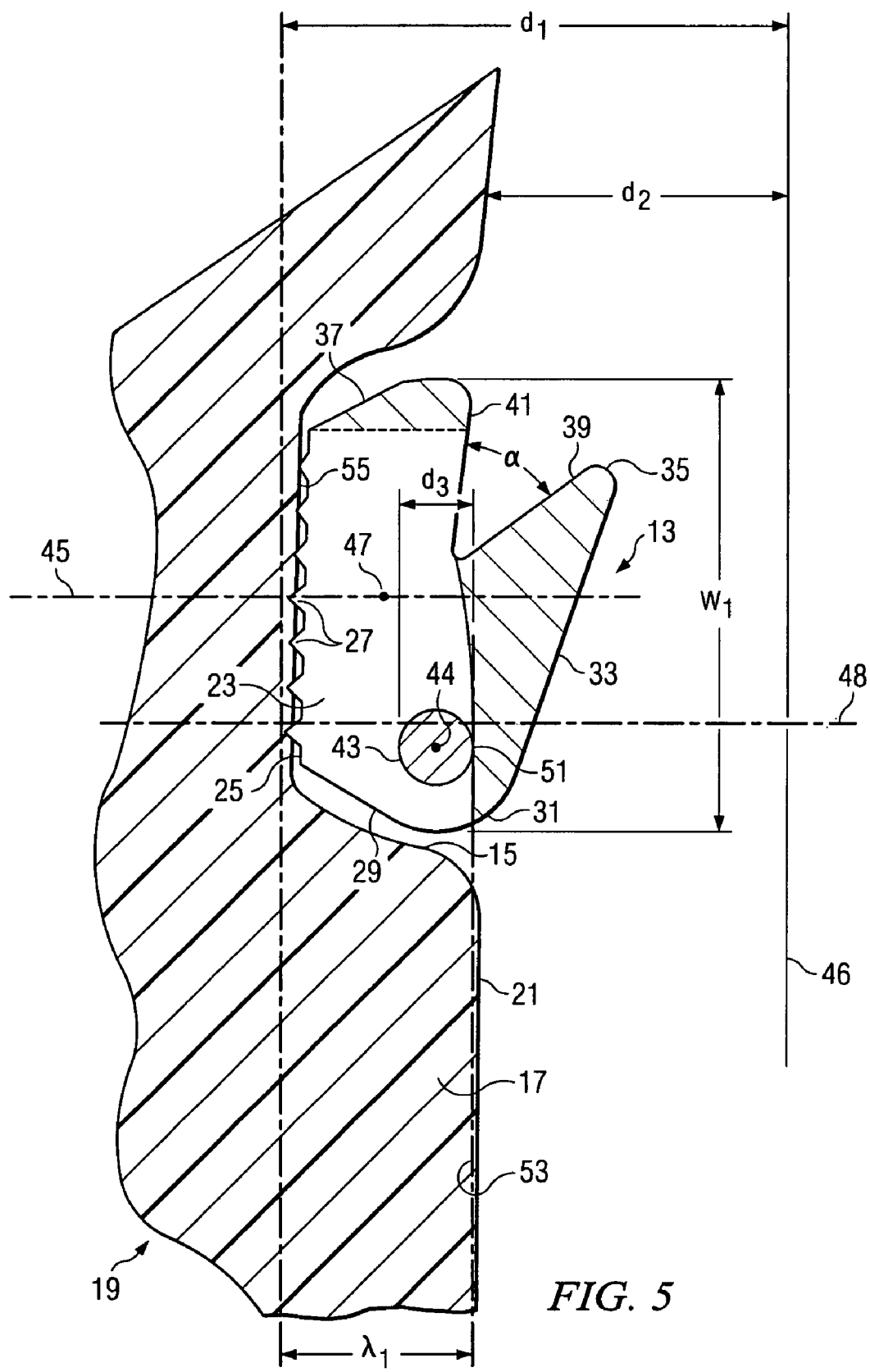
FIG. 5 is a side, partial cross sectional view of the sealing gasket of the invention showing the location of the gasket reinforcing ring.

Turning now to the attached illustrations, FIGS. 1 and 5 show the gasket of the invention and an installation apparatus used in the method of the invention. The apparatus 11 (FIG. 1) is used to install a gasket (13 in FIG. 5) within a gasket receiving groove (15 in FIGS. 2 and 5) provided within the belled end 17 of a section of thermoplastic pipe 19. The pipe section 19 can be formed of any of a variety of commercially available thermoplastic materials, such as the polyolefin family including polyethylene and polypropylene as well as polyvinyl chloride and similar materials. Thermoplastic pipes of this general type are used in a variety of industrial settings including water, sewage and chemical industries. The belled end 17 of the thermoplastic pipe section has a mouth opening 21 (FIGS. 2 and 5) which is engageable with a spigot end (not shown) of a mating pipe section to form a pipe joint. The gasket receiving groove 15 has been pre-formed in the pipe mouth opening 21 at the manufacturing facility.

A particularly preferred gasket 13 which can be used in the method of the invention is shown in cross-section in FIG. 5. Preferably, the gasket 13 is an annular, ring-shaped member formed of a flexible elastomeric material, such as a suitable rubber. As will be apparent from FIG. 5, the gasket 13 has an external diameter "$d_1$" which is greater than the internal diameter "$d_2$" of the mouth opening of the belled end of the pipe. The elastomeric material used to form the body 23 of the gasket will vary in composition depending upon the end application but may include natural and synthetic rubbers including, for example, SBR, EPDM, NBR, nitrile rubber, etc. In the embodiment of the gasket shown in FIG. 5, the gasket includes an inner sealing surface 25 which, in this case, is provided with a series of ribs or serrations 27. The gasket includes a leading face 29 which joins a convex nose region 31 which continues on to form a primary sealing surface 33. In this case, the primary sealing surface 33 is an evenly sloping, outer face of the body 23 which forms a lip region 35 thereof. The lip region is separated from a trailing face 37 of the gasket body by means of convex regions 39, 41 which allows the lip region 35 to "flap" inwardly as the mating male, spigot end of a mating pipe section encounters the primary sealing surface 33 of the gasket and pushes the lip region 35 in the direction of the surface 41.

The gasket body 23 also has a relatively rigid ring 43 embedded therein having a midpoint 44. The relatively rigid ring 43 can be made of a variety of relatively rigid materials, including hard plastics and composites, but is preferably made of steel. The relatively rigid ring is generally round in cross-section, as shown in FIG. 5, and circumscribes the annular body 23 of the gasket 13 at one embedded, circumferential location.

The positioning of the relatively rigid ring within the gasket body is critical to the method of the invention. The axis 45 in FIG. 1 passes through the approximate mid-point 47 of the gasket body 13. The relatively rigid ring 43 is located in front of the vertical axis 45 as viewed along the longitudinal axis of the pipe 46 in a location adjacent the convex nose region 31. The relatively rigid ring 43 also has a cross-sectional diameter ("$d_3$" in FIG. 5) and an internal diameter which defines a locus of points (e.g., point 51) which is equal to or greater than the internal diameter ("$d_2$" in FIG. 5) of the belled end 17 of the pipe which joins the annular groove 15. In other words, if a point 51 on the inner surface of the ring 43 is one point in the locus of points, an imaginary line 53 drawn tangent to the point 51 is approximately at the internal diameter "$d_2$" of the pipe or is located further inward in the direction of the bottom surface 55 of the groove 15.

The cross section of the gasket 13 shown in FIG. 5 has light and darkened regions which are intended to represent recommended regions for placement of the rigid ring 43. The ring 43 can be located in any region of the gasket body shown in FIG. 5 other than the darkened regions. However, the most preferred location is forward of the axis 45 in the direction of the nose region 31, as shown in FIG. 5. Most preferably, the ring 43 is located forward of the axis 48 in FIG. 5 and adjacent the nose region 31. This places the ring 43 in the forward quarter of the mass of the rubber of the gasket body.

The relatively rigid ring 43 of the annular gasket tends to resist axial forces tending to displace the gasket from the annular groove 15 when in position within the groove. To position the ring 43 at a location within the gasket body 23 so that it resides partly or wholly within the groove 15 would appear to pose a problem, since the ring diameter then exceeds the nominal pipe diameter "$d_2$". The method and installation device of the invention provide a convenient mechanism for installing the gasket within the preformed pipe groove, even with a relatively rigid ring whose ultimate internal diameter equals or exceeds the internal diameter of the remainder of the pipe.

Turning now to FIGS. 1-4, the installation device and method of installation of the improved gasket of the invention will be described in greater detail. As shown in FIG. 1, the mechanical insertion apparatus 11 includes a mounting fixture 61. The mounting fixture 61 has a spaced apart, arcuate inner portion 63 and outer portion 65. The arcuate inner portion 63 has a semi-cylindrical lip 64 which is sized to be closely received within the mouth opening 21 of the belled pipe end 17. The lip 64 is slightly tapered, as shown in FIG. 1, to assist its insertion within the pipe mouth opening. The lip 64 and mounting fixture 61 both locate the installation device and provide a mechanical assist in cooperation with a rod-like positioning guide 67 and an associated retraction element 69 to locate the gasket in "snap-fit" fashion.

The positioning guide 67 is attached to the mounting fixture so as to extend along the pipe horizontal axis (46 in FIG. 5) when in use. The guide has an outer longitudinal extent (68 in FIG. 1) which conveniently serves as a handle which can be grasped by a user in order to hand position the entire apparatus onto the mouth opening of the belled pipe end. The retraction element 69 (shown in isolated fashion in FIGS. 3 and 4) has an upper extent 71 with a cross bore 73 which rides along the length of that portion of the positioning guide 67 which is opposite the handle portion 68. The retraction element 69 is also connected to the output shaft 75 of a fluid cylinder 77 (in this case a pneumatic cylinder). Application of pneumatic pressure from a suitable fluid source (not shown) serves to extend and retract the retraction element along the horizontal work axis. In the preferred installation method of the invention, only one pneumatic cylinder 77 is used to pull the gasket 13 into the pipe groove 15 in three steps, as will be described in greater detail.

The lowermost extent 78 of the retraction element terminates in a wedge shaped scraper 80 which physically contacts the sealing gasket in order to urge the gasket into position within the internal groove provided in the belled pipe end. The wedge shaped scraper 80 has an arcuate lower profile 82 which allows it to travel smoothly along the internal diameter of the pipe mouth opening. The wedge shaped scraper is also free to pivot about a vertical axis (90 in FIG. 4) in order to contact the gasket evenly.

The operation of the mechanical operated insertion apparatus 11 will now be described. In the first step of the method, illustrated in simplified fashion in FIG. 2, the gasket 13 is first inserted within the mouth opening 21 of the belled pipe end. Because the diameter of the gasket is greater than the diameter of the pipe end opening, it is necessary to orient the gasket at an oblique angle with respect to the horizontal axis of the pipe. This allows the gasket to be inserted within the pipe mouth opening and allows the upper region of the gasket to be pulled into position in registry with the upper region of the pipe groove. The movement of the gasket from a near horizontal position to an oblique angle is indicated in phantom lines in FIG. 2.

The mechanically operated insertion device is then actuated to exert a retracting force on the annular gasket by moving the retraction element 69 along a longitudinal axis of the insertion guide, thereby pulling the trailing edge of the gasket backwards in stages in the direction of the mouth opening of the belled pipe end until the gasket again assumes a generally cylindrical shape and snaps into a locked in position within the annular groove.

Figure 2A:
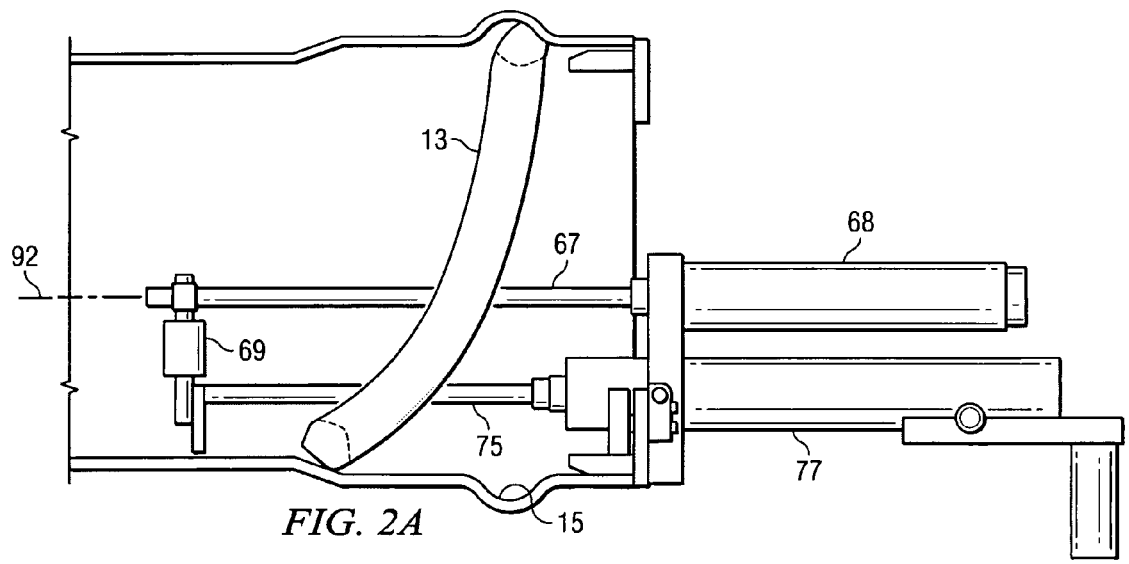
FIG. 2A is a view similar to FIG. 2 in which an insertion guide and associated retraction element are fed axially along a horizontal work axis of the belled pipe end.
Figure 2B:
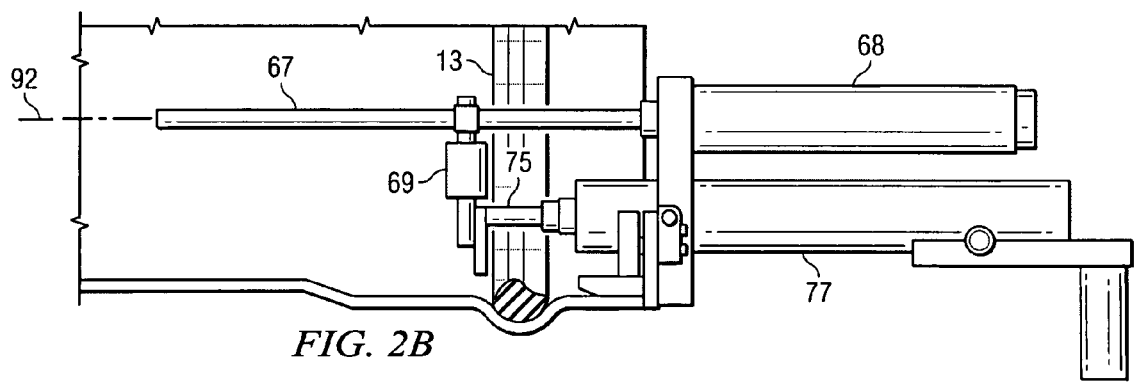
FIG. 2B is a view similar to FIG. 2A but showing the retraction element being used to pull up the trailing edge of the sealing gasket, causing the gasket to be received in snap-fit fashion within the annular groove in the belled end of the pipe.

FIGS. 2A and 2B shown the gasket 13 being grasped by the scraper 80 and pulled into locked-in position within the pipe groove 15. However, the pneumatic cylinder of the hand operated installation apparatus is preferably actuated in a three step sequence, as follows: (1) the retraction element is used to grip and pull up the lower left side of the gasket; (2) the retraction element is used to grip and pull up the lower right side of the gasket; and (3) finally, the retraction element is used to grip and pull up the center portion of the gasket until the gasket "snaps" into position in snap fit fashion within the gasket receiving groove of the belled pipe end. The longitudinal axis of the positioning guide (92 in FIGS. 2A and 2B) is oriented generally parallel to the horizontal axis (46 in FIG. 5) of the belled pipe end during the insertion operation. The gripping handle 68 of the device allows a worker to grip and support the apparatus on the belled pipe end, either at a factory location, or in a field installation.

An invention has been provided with several advantages. The method for installing a gasket of the invention allows a pipe gasket to be installed within a preexisting and preformed groove in a thermoplastic pipe. Once the gasket has been locked into position in snap-fit fashion, it is securely retained within the pipe groove and resists axial forces tending to displace the gasket from the annular groove. Because a gasket is inserted within a preformed pipe groove, the manufacturing and installation processes are simplified and made less costly. The gasket which is utilized in the process is simple in design and economical to manufacture and does not require exotic materials or multiple components. There is no need for an external retaining band to assist in securing the gasket within the pipe groove. The gasket of the invention is retained so securely within the pipe groove that it would generally be necessary to destroy the pipe material to remove the gasket once the gasket is in locked-in position.

The mechanical insertion apparatus is simple in design and economical to manufacture. The device utilizes only one fluid operated cylinder and thus is extremely dependable in operation. The device is relatively light weight and can be easily lifted and positioned by a worker in a manufacturing plant or in a field location.

While the invention has been shown in only one of its forms, it is not thus limited but is susceptible to various changes and modifications without departing from the spirit thereof.

What is claimed is:

1. A gasket for installation within a gasket receiving groove provided within the belled end of a plastic pipe section, the belled end having a mouth opening which is engageable with a spigot end of a mating plastic pipe section to form a pipe joint, the gasket comprising:

a ring-shaped gasket body formed of a flexible elastomeric material, the gasket body having an approximate midpoint thereon, the gasket body having a single relatively rigid ring located at an embedded location which circumscribes the gasket body, the relatively rigid ring being generally round in cross section, the relatively rigid ring having a cross sectional diameter which defines a locus of points on an inner surface thereof which is equal to or greater than the internal diameter of the remainder of the belled end of the pipe which joins the gasket receiving groove when the gasket is installed within the belied pipe end;

wherein the gasket body has an inner sealing surface which is provided with a series of serrations thereon, the inner sealing surface being joined to a leading face which joins a convex nose region which continues to form a primary sealing surface, the primary sealing surface comprising an evenly sloping outer face of the body and which forms a lip region thereof, the lip region being separated from a trailing face of the gasket body by means of a pair of convex regions which allow the lip region to converge inwardly as the mating male spigot end of the mating pipe section encounters the primary sealing surface of the gasket;

wherein the gasket body has a width to thickness ratio and wherein the ratio is greater than about 1.75:1.0;

wherein a vertical axis passes though the approximate midpoint of the gasket body and the relatively rigid ring is located within the gasket body in front of the vertical axis, as viewed along the longitudinal axis of the pipe, in a location adjacent the convex nose region; and wherein the gasket body has a forward quarter, as viewed in cross-section, and wherein the relatively rigid ring is located in the forward quarter of the mass of the rubber of the gasket body.

2. The gasket of claim 1, wherein the relatively rigid ring is formed of a material selected from a group consisting of hard plastics and composites, and steel.

3. The gasket of claim 1, wherein the elastomeric material used to form the body of the gasket is formed of a material selected from the group consisting of natural rubbers, synthetic rubbers, styrene-butadiene rubber, ethylene propylene diene monomer rubber, acrylonitrile butadiene rubber, and nitrile rubber.

* * * * *